(12) United States Patent
Acar et al.

(10) Patent No.: US 7,137,080 B2
(45) Date of Patent: Nov. 14, 2006

(54) METHOD FOR DETERMINING AND USING LEAKAGE CURRENT SENSITIVITIES TO OPTIMIZE THE DESIGN OF AN INTEGRATED CIRCUIT

(75) Inventors: Emrah Acar, Austin, TX (US); Anirudh Devgan, Austin, TX (US); Sani R. Nassif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 10/646,425

(22) Filed: Aug. 22, 2003

(65) Prior Publication Data

US 2005/0044515 A1 Feb. 24, 2005

(51) Int. Cl.
*G06F 17/50* (2006.01)

(52) U.S. Cl. ........................ 716/2; 716/1; 716/4; 716/5; 716/10

(58) Field of Classification Search ............ 716/1, 716/2, 4, 5, 7, 10; 703/19; 327/200
See application file for complete search history.

(56) References Cited

U.S. PATENT DOCUMENTS

| 6,427,226 | B1 * | 7/2002 | Mallick et al. ............... | 716/10 |
| 6,687,883 | B1 * | 2/2004 | Cohn et al. .................. | 716/4 |
| 6,711,719 | B1 * | 3/2004 | Cohn et al. .................. | 716/2 |
| 2003/0177460 | A1 * | 9/2003 | Chen ............................. | 716/5 |
| 2004/0230924 | A1 * | 11/2004 | Williams et al. ............. | 716/2 |

OTHER PUBLICATIONS

Mill-Jer Wang et al., "Guardband determination for the detection of off-state and junction leakages in DRAM testing", Nov. 19-21, 2001, Test Symposium, Proceedings. 10th Asian,Digital Object Identifier 10.1109/ATS.2001.990274, pp. 151-156.*

Liu et al., "Power supply current detectability of SRAM defects", Nov. 23-24, 1995, Test Symposium, Proceedings of the Fourth Asian, Digital Object Identifier 10.1109/ATS.1995.485362,□□pp. 367-373 □□.*

De Salvo et al., "Experimental and theoretical investigation of nonvolatile memory data-retention",Jul. 1999, Electron Devices, IEEE Transactions on,vol. 46, Issue 7, Digital Object Identifier 10.1109/16.772505, pp. 1518-1524 □□.*

(Continued)

*Primary Examiner*—A. M. Thompson
*Assistant Examiner*—Helen Rossoshek
(74) *Attorney, Agent, or Firm*—Richard F. Frankeny; Winstead Sechrest & Minick P.C.

(57) ABSTRACT

An integrated circuit design has circuit macros made up of device cells. The cells are characterized by determining the leakage current dependency on various process, environmental and voltage parameters. When circuit macros are designed their leakage power is calculated using this data and multi-dimensional models for power and temperature distribution. Circuit macros are identified as timing-critical and timing-noncritical macros. Statistical methods are used to determine the average leakage sensitivities for the specific circuit macros designed. The designer uses the sensitivity data to determine how to redesign selected circuit macros to reduce leakage power. Reducing leakage power in these selected circuits may be used to reduce overall IC power or the improved power margins may be used in timing-critical circuits to increase performance while keeping power dissipation unchanged.

20 Claims, 13 Drawing Sheets

OTHER PUBLICATIONS

Thibeault et al., "A novel probabilistic approach for IC diagnosis based on differential quiescent currrent signatures", Apr. 27-May 1, 1997, VLSI Symposium, 15th IEEE,Digital Object Identifier 10.1109/VTEST.1997.599445, pp. 80-85 ☐☐.*

Mukhopadhyay et al., "Modeling and estimation of total leakage current in nano-scaled CMOS devices considering the effect of parameter variation", 2003, ISBN:1-58113-682-X, ACM Special Interest Group on Design Automation, pp. 172-175.*

Sirichotiyakul et al., "Duet: An Accurate Leakage Estimation and Optimization Tool for Dual-Vt Circuits", Apr. 2002, IEEE Transactions on Very Large Scale Integration (VLSI) Systems, vol. 10, No. 2, pp. 79-90.*

Lee et al., "Simultaneous State, Vt and Tox Assignment for Total Standby Power Minimization", 2004, IEEE/ACM Design, Automation and Test Europe, pp. 494-499☐☐.*

* cited by examiner

| 301 | 302 | 303 | 304 | 305 | 306 |
|---|---|---|---|---|---|
| Circuit | # Cells | # inputs | $I_{max}$(mA) | $I_{min}$(mA) | cv. |
| c432 | 187 | 36 | 0.073899 | 0.0597 | 0.0237 |
| c499 | 222 | 41 | 0.21463 | 0.153863 | 0.0337 |
| c880 | 383 | 60 | 0.132035 | 0.095789 | 0.0335 |
| c1355 | 566 | 41 | 0.173451 | 0.127854 | 0.0301 |
| c1908 | 996 | 33 | 0.312824 | 0.210898 | 0.0610 |
| c2670 | 11255 | 233 | 0.427436 | 0.325011 | 0.0363 |
| c5311 | 2485 | 178 | 0.824406 | 0.670118 | 0.0279 |
| c7752 | 3692 | 270 | 0.713998 | 0.665011 | 0.0483 |

FIG. 3

| State | Gate leakage | Subthreshold Leakage | Total Leakage | State Occurrence Probability |
|---|---|---|---|---|
| 00 | $G_{00}$ | $S_{00}$ | $L_{00}=G_{00}+S_{00}$ | $(1-P_1)(1-P_2)$ |
| 01 | $G_{01}$ | $S_{01}$ | $L_{01}=G_{01}+S_{01}$ | $(1-P_1)P_2$ |
| 10 | $G_{10}$ | $S_{10}$ | $L_{10}=G_{10}+S_{10}$ | $P_1(1-P_2)$ |
| 11 | $G_{11}$ | $S_{11}$ | $L_{11}=G_{11}+S_{11}$ | $P_1 P_2$ |

$$P_1(1-P_2)+(1-P_1)P_2+(1-P_1)(1-P_2) = 1-P_1 P_2$$

| Circuit | Ave Leakage(W) | SP Method (W) | Rel. Error(%) |
|---|---|---|---|
| c432 | 0.06599 | 0.06800 | 3.056 |
| c499 | 0.17885 | 0.17786 | -0.556 |
| c880 | 0.10857 | 0.10927 | 0.643 |
| c1355 | 0.13828 | 0.14236 | 2.950 |
| c1908 | 0.22508 | 0.21437 | -4.758 |
| c2670 | 0.34197 | 0.34638 | 1.290 |
| c5311 | 0.70782 | 0.71171 | 0.549 |
| c7752 | 0.99772 | 0.97618 | -2.158 |

FIG. 7

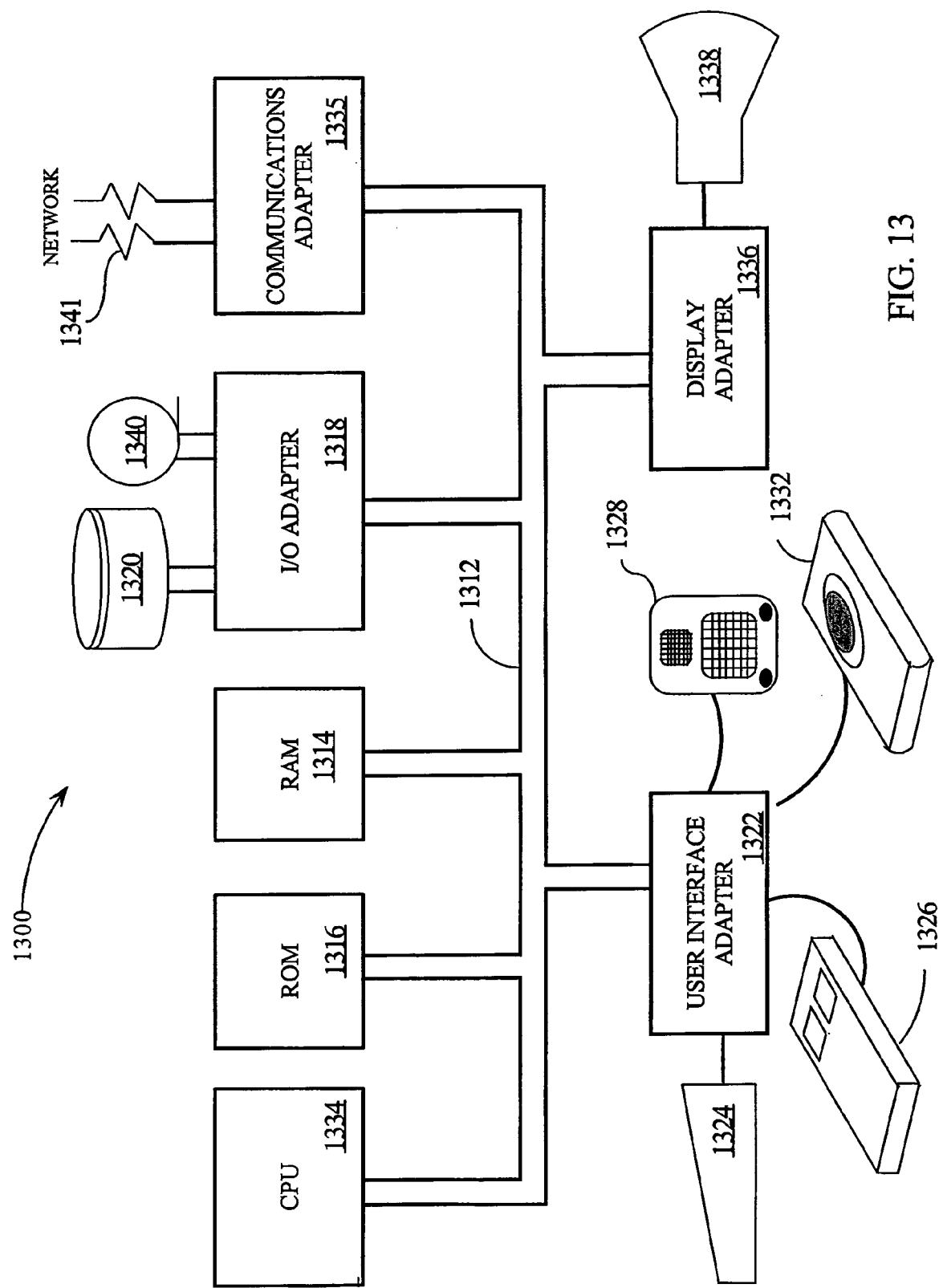

METHOD FOR DETERMINING AND USING LEAKAGE CURRENT SENSITIVITIES TO OPTIMIZE THE DESIGN OF AN INTEGRATED CIRCUIT

TECHNICAL FIELD

The present invention relates in general to methods and algorithms for determining full leakage sensitivities and using the leakage sensitivities to optimize the design of an integrated circuit (IC).

BACKGROUND INFORMATION

With continuous shrinking of minimal feature size, leakage current is expected to become a major challenge for future complementary metal oxide silicon (CMOS) designs. Although each is about 10% of total chip power for the current generation of CMOS technology, the number is expected to rise to 50% for next generation techniques. The increasing leakage current not only poses a problem for battery powered devices, such as mobile and hand-held electronics, it is increasingly critical for active operation as it is becoming a higher percentage of total power.

Most of the leakage estimation and reduction techniques have focused on sub-threshold leakage due to the lowering of the power supply voltage and the accompanying reduction of the threshold voltage. With the reduction of the gate oxide thickness, the gate leakage current can no longer be ignored. Gate leakage is on a trend to become comparable to the sub-threshold leakage. An accurate full chip leakage estimation needs to consider both gate and sub-threshold leakage.

Methods to estimate the full chip leakage have been reported in several publications. The authors of one publication use a linear regression model to estimate full chip leakage based on the gate count in the application specific integrated circuit (ASIC) environment. In another publication, a method is proposed to include the effect of width in die process variation. It is known that the leakage current has strong dependency on the environmental factors, such as channel temperature, power supply voltage (Vdd) and workload. The leakage power has a near linear dependency on temperature, for example, a 30° C. change in temperature will affect the leakage by 30%. However, leakage power's dependency on Vdd is more exponential, whereby a 20% fluctuation in Vdd may affect the leakage power by more than a factor of two.

Chip designers have used empirical methods to estimate leakage power which assumes a uniform temperature and Vdd distribution across the whole chip. However, in today's complex industrial designs, both temperature and Vdd fluctuations have very strong locality, i.e., they are not uniform across the chip. The exact amount of these fluctuations at certain locations depends on the distribution of the transistors and decoupling capacitors, the workload, as well as the quality of the power grid and package design. Leakage also depends on circuit topology as well as process parameters. Empirical methods in full chip leakage estimation are too simplistic thus inaccurate.

Modern ICs used to implement computer and other data processing functions usually have circuit macros whose performance determines the processing power of the IC. These timing-critical circuit macros may only constitute 20% of the total circuits for the function of the IC. The other 80% of the circuits (timing-noncritical) are not as timing or speed dependent. However, leakage power is primarily dependent on the logic states of nodes, IC power supply voltage, temperature, and process variables. Therefore, the timing-noncritical circuitry may be dissipating more leakage power than is necessary. If the leakage power for the timing-noncritical circuitry could be reduced, then the excess power margin may be used to increase the performance of the timing-critical circuitry while keeping overall chip power within a desired limit. To do this, leakage power needs to be considered during the design process. Furthermore, the chip designers need to know how leakage power varies with process, feature size, and environmental factors so that design tradeoffs may be done that are most effective in reducing leakage power.

There is, therefore, a need for a method to determine average leakage power sensitivities for circuit macros that are independent of circuit state as well as a method for using leakage power sensitivities in the IC design process to optimize the IC.

SUMMARY OF THE INVENTION

During an integrated circuit (IC) design process, the IC designer may partition the IC's total circuitry into circuit macros separating timing-critical and timing-noncritical circuitry into definable circuit macros. Leakage power and dynamic power are determined for the IC. The leakage and dynamic power may then be used to determine temperature distribution across the IC and corresponding to the circuit macros. The IC total power dissipation and temperature may then be analyzed to determine if adjustments in the power budget would be advantageous. Leakage dependence on process, environmental, and circuit topology parameters have been pre-determined by circuit analysis and simulation tools. Once the circuit macros have been designed, then state probability analysis is done to determine the average leakage for the circuit macros which is now independent of circuit states and is a function only of the particular macro device topologies, process, and environmental parameters. Since the dependencies of leakage on the various parameters are known, the leakage sensitivities may be calculated including first and higher derivatives. The leakage sensitivities for the circuit macros are used by the IC designer to modify the circuit macros to optimize the chip design by choosing those parameters that have the most effect in reducing leakage power while meeting other circuit functional requirements. Once leakage power has been reduced for the selected circuit macros, then the excess power budget may be used to improve performance of other circuit macros while staying within an overall power dissipation budget.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a table showing the dependency of leakage currents on input vectors for a variety of ISCAS benchmark circuits;

FIG. 7 is a table showing average leakage power determined using embodiments of the present invention;

FIG. 13 is a block diagram of a data processing system suitable for practicing embodiments of the present invention while running a computer program product using method steps of the present invention.

DETAILED DESCRIPTION

Figure 1:
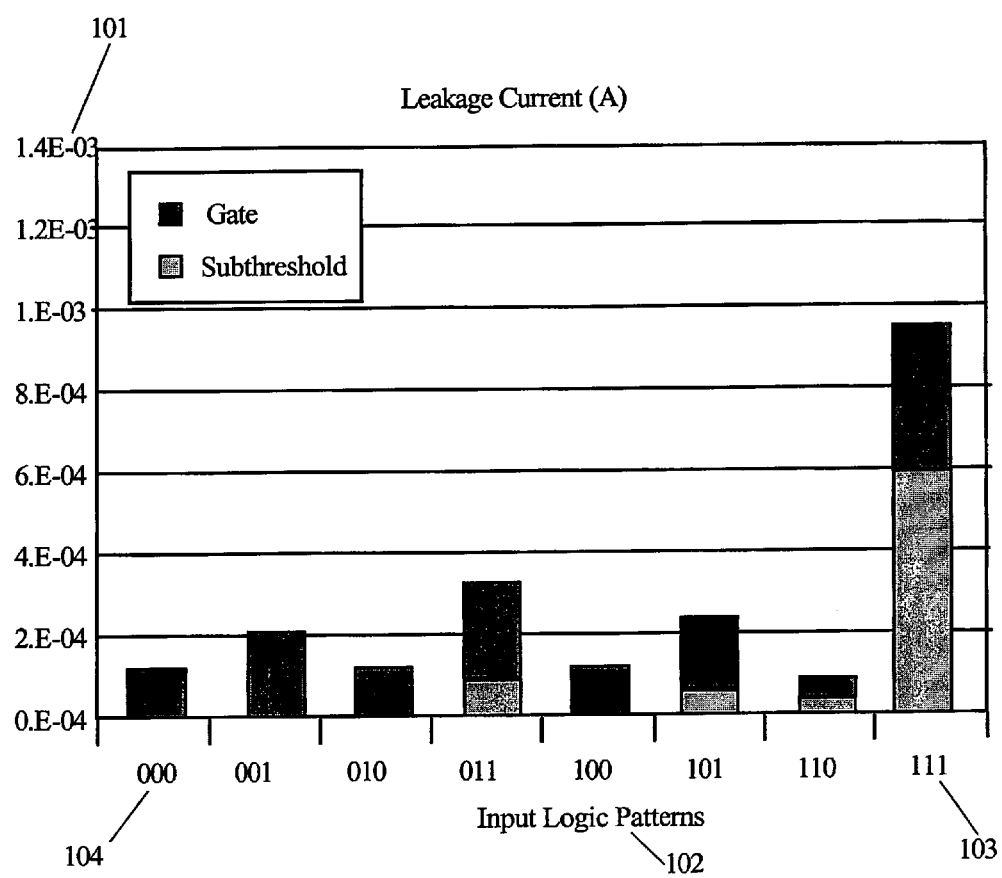
FIG. 1 is a diagram illustrating the leakage current versus input logic states for a 3-input NAND gate.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Leakage power is emerging as a new critical challenge in the design of high performance integrated circuits. It has been shown in many research reports that leakage is increasing dramatically with each technology generation and is expected to dominate total system power. Embodiments of the present invention provide a method for efficient and accurate leakage estimation of combinatorial logic circuits using a static, i.e., input independent, approach. A probabilistic technique is employed to compute the average leakage of combinatorial circuits considering all possible input patterns. Furthermore, the input dependency of leakage for large combinatorial circuits is fairly small due to an averaging effect further enabling a static estimate. Embodiments of the present invention give accurate results with an average error of only 2% for circuit benchmarks, e.g., the ISCAS benchmark circuits. The present invention may be used to predict the leakage power components separately, namely the sub-threshold and gate leakage components of the circuit. Furthermore, the leakage sensitivities of the circuit with respect to environmental and process variables may also be predicted using the disclosed method. The application of the sensitivities predicted may be used in developing simple and efficient compact models for circuit leakage. The leakage sensitivities may also be employed in a wide range of applications including performance optimization, manufacturing yield improvement, and product quality enhancement.

Early work on leakage estimation mainly focused on sub-threshold leakage and the dependence of leakage on the state (or the input pattern) of the circuit. Typically, CMOS circuits were macro-modeled by transistor stacks for which leakage is computed using analytical expressions. Simple analytical expressions may be derived for the leakage current of a transistor stack. A statistical approach may also be used to discover low leakage patterns while using both branch-and-bound and heuristic algorithms to find leakage power bounds. Also, an automatic test pattern generation based approach may be used to find leakage power bounds and associated input patterns. For full-chip total leakage power estimation, regression models based on gate and transistor counts may also be used. However, accuracy of simple regression models are generally difficult to control. Furthermore, simple regression models ignore the dependence of leakage on circuit topology. A more accurate approach estimates total leakage power after an effective stacking approximation. The effective stacking estimates for each cell are weighted by their usage counts. However, in this model circuit functionality is not considered. Furthermore, macro-modeling each cell by a transistor stack may produce undesirable errors.

Leakage may be predicted either by accurate input-dependent analysis, or by less accurate higher-level models based on total transistor width or gate count. In many aspects, the consideration for input dependency presents a clear trade-off between accuracy and efficiency of the analysis method applied. With the advent of new integration technologies, there is a need for both efficient and accurate leakage power estimation for proper design and optimization. Embodiments of the present invention use powerful, static, i.e., input-independent, analysis techniques for leakage estimation that delivers the desired accuracy and efficiency. However, dynamic (input-dependent) techniques may still be used in evaluating special circuit topologies for leakage mitigation, however for most common combinatorial circuits, static methods are highly applicable. Embodiments of the present invention accurately account for circuit topology and connectivity of the devices which does not occur when using crude estimation methods.

Embodiments of the present invention predict the leakage sensitivity with respect to environmental and process parameters and use leakage sensitivities in design optimization and planning. The sensitivities of leakage with respect to a designated parameter may be computed along with the static leakage estimate. Furthermore, embodiments of the present invention utilize leakage sensitivity information to model the parametric dependence of leakage. Embodiments of the present invention are applicable for combinatorial logic circuits. Other circuit functions of an IC, including memory and clocking system elements (caches, registers and latches) may be modeled directly since they are more regularly structured, heavily reused and easier to pre-characterize.

Leakage current depends on many key circuit variables such as input stimulus, device characteristics (threshold voltage, gate oxide thickness, channel length), and operating conditions (VDD and temperature). The input dependence of leakage for a basic logic gate implemented with a leading process technology is first explained.

Figure 2:
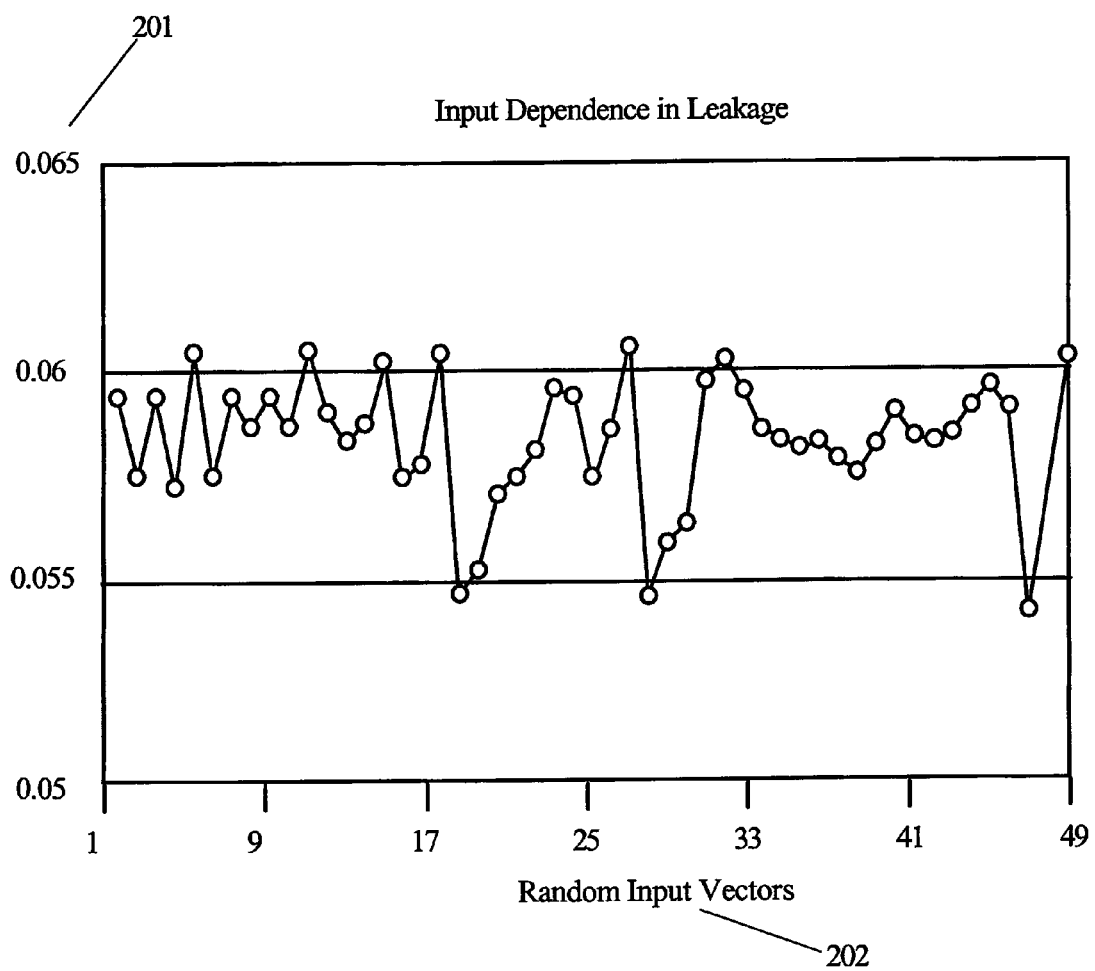
FIG. 2 is a diagram illustrating the dependency of total leakage on input vectors for an International Symposium of Circuits and Systems (ISCAS) benchmark circuit.

The total leakage currents for a 3-input NAND gate (not shown) for all possible input logic state patterns 102 are shown in FIG. 1. It is clear from FIG. 1 that there is a significant input dependency of leakage current 101. The pattern 103 (111) creates 10 times more leakage than the pattern 104 (000). However, as the size of the combinatorial circuit increases, this input-dependency becomes weaker. This is mainly due to an averaging effect in the circuit that balances out high and low leakage states. As an example, the total leakage 201 for the ISCAS benchmark circuit c432 (not shown) is illustrated in FIG. 2 for many random input vectors 202. The circuit c432 is synthesized with a typical gate library satisfying pre-specified delay targets. Input dependence of total leakage for other circuits is summarized in Table 1 of FIG. 3. For each benchmark circuit 301, the extreme statistics ($I_{max}$ 304 and $I_{min}$ 305) and coefficient of variation (cv.) 306 (standard deviation/mean) of leakage currents with 10000 random input patterns are reported. Table 1 shows that total leakage varies (304 and 305) by about 15% with the inputs (303) applied to the circuit 301 comprising cells 302. For larger size circuits, a similar trend is observed.

Figure 4:
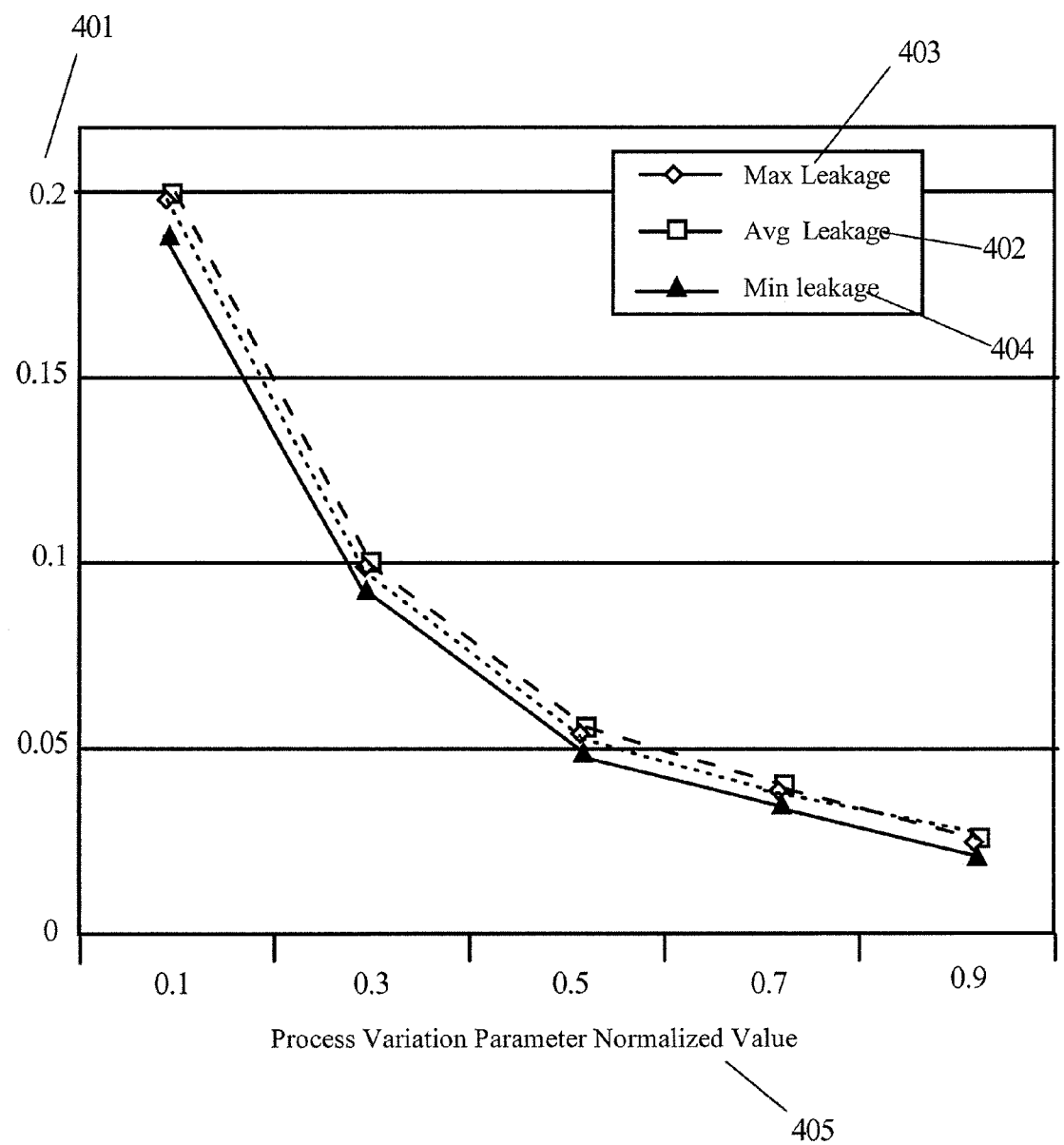
FIG. 4 is a diagram illustrating the impact of process variations on leakage current for ISCAS benchmark circuit c432.

Leakage dependency on input vectors may be significant, but it is less important than the effects of environmental variables (power supply voltage, temperature) and process variations (effective channel length, threshold voltage, oxide thickness, etc.). To illustrate this assertion, the impact of process variations on leakage is summarized in FIG. 4. FIG. 4 shows how leakage current 401 varies with different process conditions 405. A normalized process parameter is used to model the process conditions between the "fast" and "slow" corners. The nominal process conditions 405 are represented by 0.5, namely the nominal values for effective channel length, threshold voltage, oxide thickness. At each process point, the variation of leakage due to input vectors is also shown by the maximum 403, average 402, and minimum 404 leakage obtained for a large sample of inputs.

Figure 5:
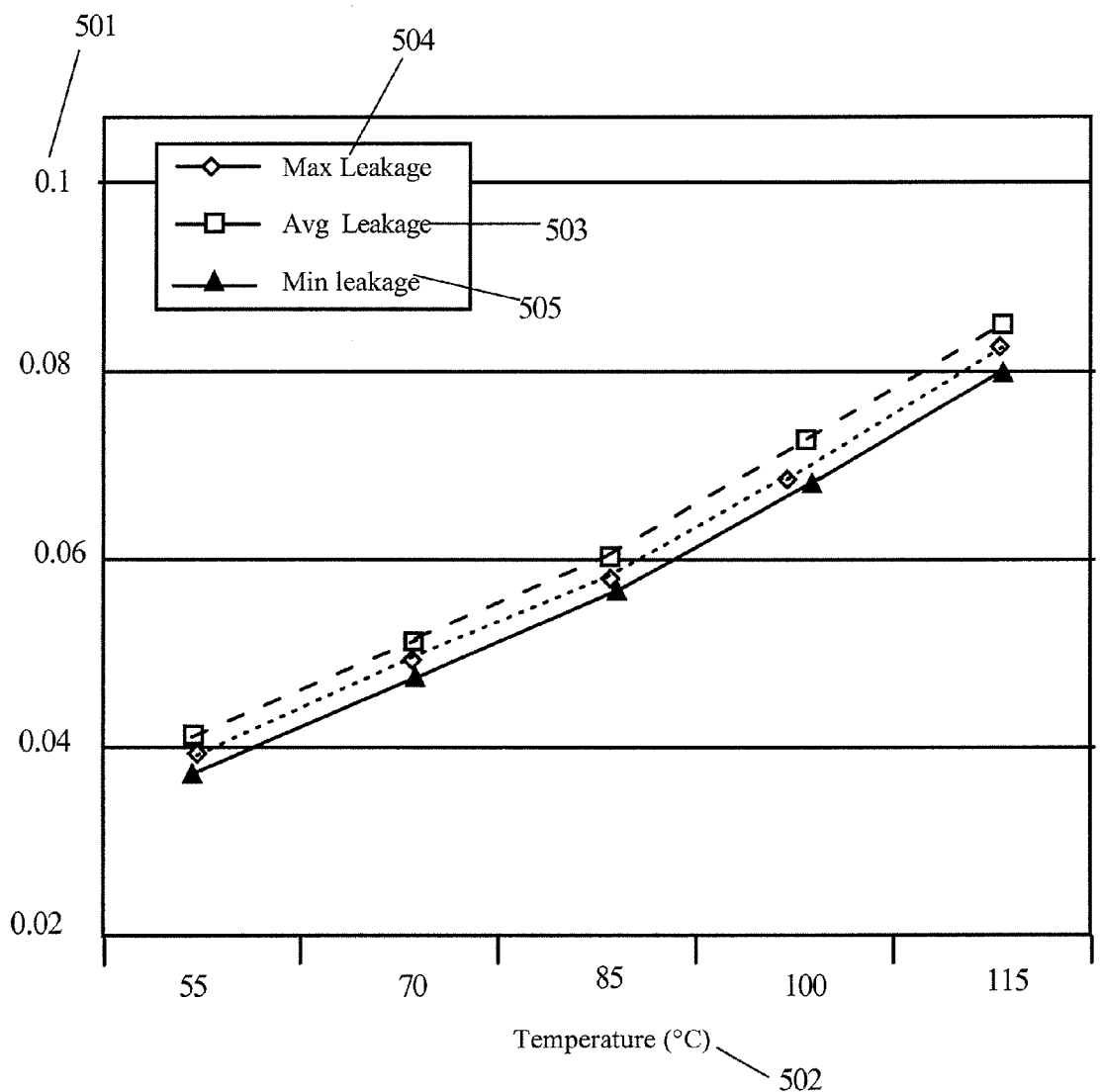
FIG. 5 is a diagram illustrating the impact of temperature variations on leakage current for ISCAS benchmark circuit c432.

FIG. 5 illustrates the impact of temperature variations on the leakage current 501 for benchmark circuit c432 (not shown). FIG. 5 shows that leakage current 501 varies much more with the process parameter than with input variations. Similarly, FIG. 5 shows the dependence of leakage on temperature for circuit c432. The maximum 504, average (mean) 503, and minimum 505 leakage current for different input vectors at each temperature are also plotted. Just like the process variation parameter, the leakage varies much more due to temperature compared to input vectors. A similar trend is also observed for the leakage current's dependency on power supply voltage (Vdd) (not shown).

While the dependence on input remains important and needs to be captured in some cases, e.g., for the standby mode, the leakage dependencies on process parameters, temperature, and Vdd are more important in an effective leakage estimation methodology. Therefore, it is desirable to develop a static (input-independent) method for predicting the average leakage power under possible input conditions. By dropping the variability on the inputs, the effects of temperature, power supply and process variations may be accounted for more readily and efficiently. This static approach accurately considers average leakage power for all possible input patterns, realizing an overall assessment of the leakage for a considerably long operation time.

Combinatorial logic circuits are generally partitioned into smaller cells, in the form of gates, channel-connected regions or other primitive structures. The node variables at the cell boundaries are assumed to hold full logic values (1 or 0). Total leakage power dissipation is basically the sum of the leakage dissipated in each cell. Assume that the leakage power for each cell is pre-characterized for all circuit input states. This may be done via accurate circuit simulation during library generation. Denoting the leakage power as $L_i(x_i)$ for a cell i for input vector; the total leakage power for a given input vector will be:

$$L_{tot} = \sum_i L_i(x_i) \tag{1}$$

It should be noted that the current state of the circuit, i.e. the inputs for each cell, will depend on the connectivity and functionality implemented in the circuit.

Probabilistic approaches have been used for switching power estimation but do not model the temporal (or delay) dependency of switching power. Leakage, however, is delay-independent and hence more suitable for a probabilistic approach.

Node Occurrence Probability is defined in the following. A node n is assumed to be either a primary input or an output of a particular cell at a full logic state value (Vdd or ground). The node occurrence probability of n may be defined as the likelihood of observing the node n at logic value 1 and may be written as $P_N$ (probability that node n has a logic 1 state) Hence, the probability of observing node n at a logic 0 state would be $1-P_N$.

State Occurrence Probability is defined in the following. The state occurrence probability, $\Pi_i(x)$, may be defined as the probability of observing the cell at the logic state uniquely imposed by an input x. State occurrence probability may be referred to as the joint probability of the input nodes of cell i. If the cell inputs are independent, computation of $\Pi_i(x)$ is simply the multiplication of the associated node occurrence probabilities. An example is given in FIG. 6 for a 2-input NAND gate 601. Given that the input occurrence probabilities $\pi_1$ and $\pi_2$ for the inputs, the output probability is illustrated by the equation 602. Logic states 603 applied to NAND gate 601 have corresponding gate leakage currents 604 and subthreshold leakage currents 605. The subthreshold leakage is the leakage that occurs, for example, between the drain and source of a field effect transistor in the logic gate when its gate is below its switching threshold. Total leakage current 606 for each input pattern is the sum of the corresponding gate leakage 604 and subthreshold leakage 605. Since the leakage for each input pattern is different, the average leakage is determined by the state occurrence probability 607 of a particular pattern and its corresponding leakage (604 and 605).

Average Leakage Power is defined in the following. The true probabilistic mean of the total leakage power ($\mu_{Ltot}$) is the weighted sum of the leakage for all cells in each state. The weights are simply the state occurrence probabilities:

$$\mu_{Ltot} = \sum_i \mu_{L(x_i)} = \sum_i \sum_{x_i} \prod_i (x_i) L_i(x_i) \tag{2}$$

Pre-characterization of leakage currents are done by simulation and analysis programs and stored, for example, in the cell library. Therefore, the set of $L_i(x_i)$ values are available for each cell from the cell library. Hence, the exact computation of Equation (2) above requires the true state occurrence probabilities, $\Pi_i(x_i)$, for each cell and state. However, the exact computation for $\Pi_i(x_i)$n for combinatorial circuits has been shown to be a difficult problem.

A practical approach to predict the state occurrence probabilities using circuit and input information is to ignore spatial dependencies, e.g., where a gate is located, within the circuit for the sake of simplicity and efficiency. Results have demonstrated that spatial dependencies do not contribute greatly to average leakage estimation, since the estimates are already very accurate. Furthermore, this approach may exploit input probabilities when specified.

Consider a circuit cell C with an input vector $x=x_1 x_2 \ldots x_n$ and the output node $N_o$. Under the spatial independence assumption, the node occurrence probability for the output node $N_o$ is defined as:

$$P_{No} = Pr(x_1, x_2, \ldots | \text{state } O(x) = 1) = \sum_{O_i \in m(o)} Pr(x = O_i) \quad (3)$$

where $O(x)$ denotes the logic function and $m(o)$ is the set of mini-terms in the logic function for $O(x)$ in terms of inputs $x_i$. With the spatial independence assumption, the state occurrence probability for circuit cell C becomes the multiplication of node occurrence probabilities of all its inputs:

$$\prod_i (x) = \prod_i (x_1 x_2 \cdots x_n) = P_{x1} P_{x2} \cdots P_{xn} \quad (4)$$

Figure 6:
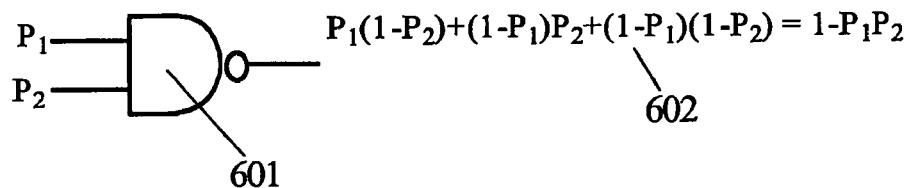
FIG. 6 is a table illustrating the calculation of output node occurrence probability for a 2-input NAND gate.

Moreover, once the state occurrence probabilities are computed, they may be separately used for calculations involving the leakage components, i.e., gate and sub-threshold leakage currents. These values are computed during pre-characterization using the method as shown in FIG. 6.

Based on the estimates of $\Pi_i(x_i)$ under the spatial independence assumption, the Static Probabilistic (SP) method estimates the average leakage power as:

$$\hat{\mu}_{SP,Ltot} = \sum_i \sum_{x_i} \hat{\prod}_i (x_i) L_i(x_i) \quad (5)$$

The spatial independence assumption guarantees that node and state occurrence probabilities may be computed simultaneously via a level-order (logic depth) traversal of the circuit in linear time. Hence, its runtime complexity grows with the depth of the circuit and the number of cell inputs. In comparison to switching probability, the described approach may easily solve circuits with feedback. But the effects of reconvergent fan-out or existing primary input correlation may be ignored by the spatial independence assumption.

The SP method according to embodiment of the present invention may also be used to estimate the variance of the leakage power of a combinatorial circuit. With the spatial independence assumption, the variance of the total leakage, $\sigma^2$ Ltot, is the sum of each cell's leakage current variance, which is expressed in terms of state of occurrence probabilities of that particular cell. As a consequence, the variance estimate of the total leakage is:

$$\sigma^2_{SP,Ltot} = \sum \sum \left\{ \hat{\prod} i(x_i) L_i^2(x_i) - \left( \sum \hat{\prod} i(x_i) L_i(x_i) \right)^2 \right\} \quad (6)$$

The variance estimate predicts the amount of variability of leakage current due to input variations and may be used as an indication of input dependencies. This may be used to trigger a dynamic estimation of particular circuit that displays significantly large input dependencies.

The SP method of the present invention provides an added accuracy in leakage power estimation over simple device-count or gate-count based methods since it exploits more information on the circuit including topology and connectivity. If better accuracy is desired, sophisticated methods may also be employed to account for spatial correlation; however, this may significantly increase the overall runtime complexity.

The following presents some experimental results with ISCAS benchmark circuit models using embodiments of the present invention. The combinatorial ISCAS circuits were synthesized using a library of basic gates with delay constraints. A state-of-art process technology is used. The total leakage of each circuit for a given input vector is estimated via a circuit simulator (e.g., SPICE) under nominal conditions. For each circuit, total leakage current was evaluated for a sample of 10000 randomly generated input vectors. Each primary input is assumed to have binary node occurrence probability of 0.5. The average leakage is computed simply by taking the arithmetic mean. It was observed that 10000 samples were sufficient for an accurate estimation.

A small C-program was used to calculate the SP estimate for average leakage. Table 2 in FIG. 7 shows the results obtained with the SP method. Note the excellent agreement between the actual average leakage currents 702 and SP estimates 703. The average relative error 704 is only about 2%. For the circuits 701, the SP estimate 703, using embodiments of the present invention, determines results many orders of magnitude faster than would be achieved by running a circuit simulation, even for a single input vector. FIG. 7 illustrates the computational advantages of using the static method in leakage estimation according to embodiments of the present invention.

Figure 8:
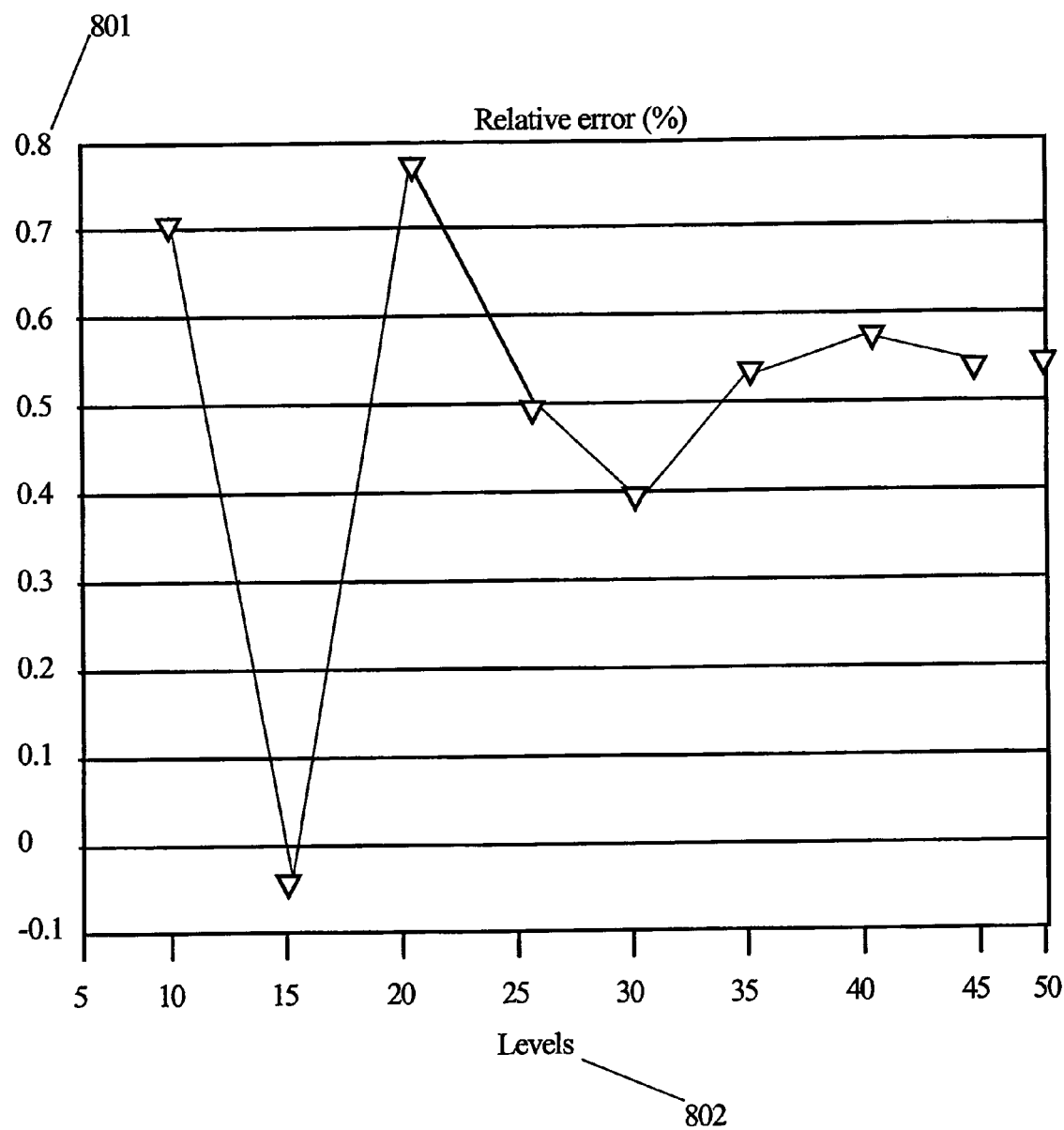
FIG. 8 is a diagram illustrating relative error using various logic depth levels for ISCAS benchmark circuit C5315 using embodiments of the present invention.

Normally for digital circuits, size and logic depth greatly impact the significance of spatial dependencies. Typically, one would expect more significant spatial dependencies for circuits with less logic depth. Since the notion of the spatial dependency is hard to quantify and test, a simple analysis may be performed on the robustness of the SP method with circuits of varying sizes and logic depths. By doing this analysis, the behavior of the SP estimate at various levels of spatial correlation may be observed. A circuit, c5315, which is originally implemented in 50 logic depth levels was used as an example. By extracting the cells between the primary inputs and specified logic depths, many sub-circuits may be extracted with varying logic depths. These circuits may have different spatial dependencies although they share the same inputs. FIG. 8 shows that the percentage variation 801 of the SP method is for different logic depth levels 802, hence the independence assumption shows considerable merit.

Figure 9:
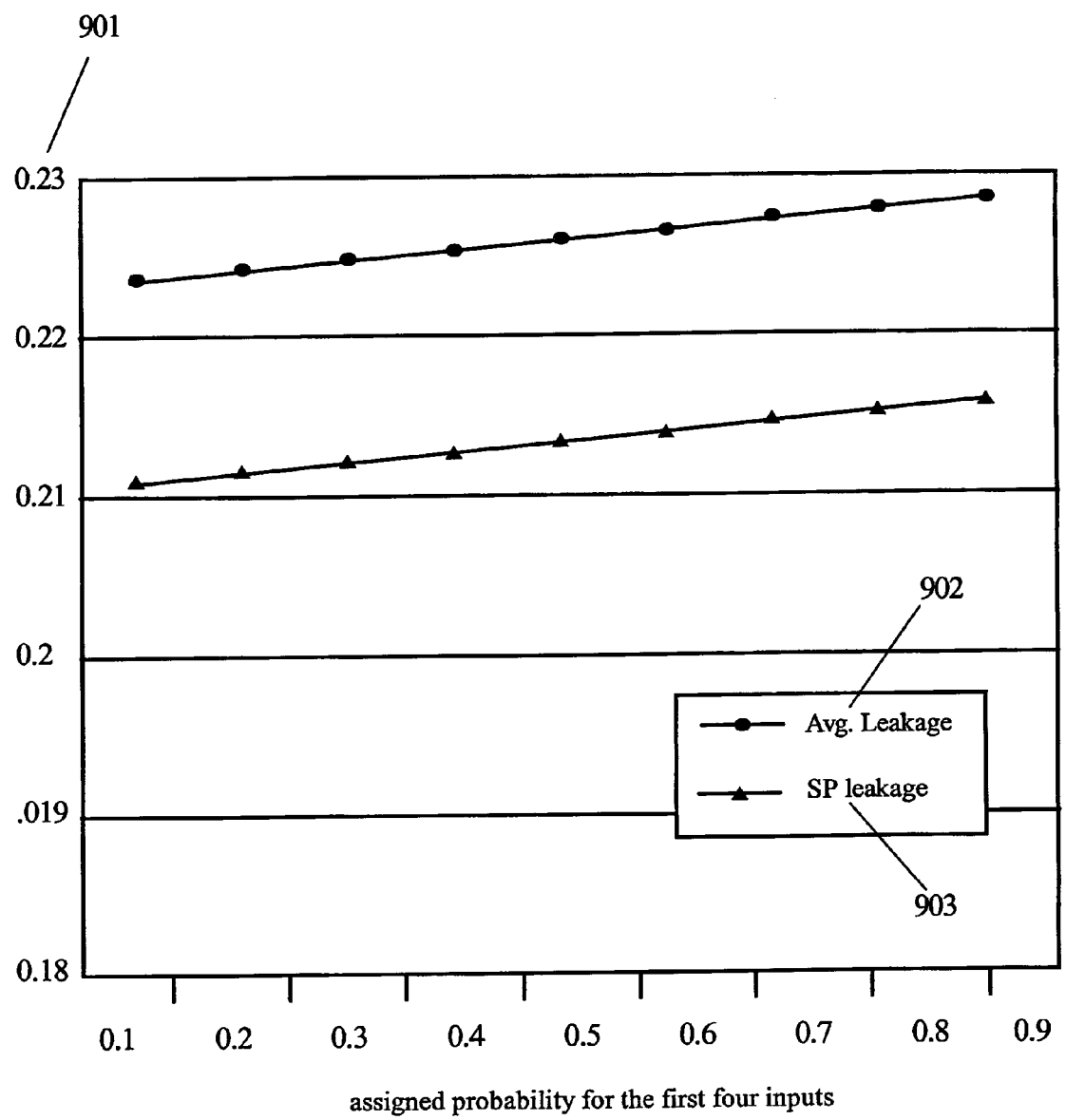
FIG. 9 is a diagram illustrating a comparison average leakage power to an estimate of leakage power using embodiments of the present invention.

The following demonstrates an important feature of the SP method in handling pre-specified primary input probabilities. As an illustration, the node occurrence probability for the first four inputs of benchmark circuit c1908 (not shown) is varied from 0.1 to 0.9 in 0.1 increments. All other inputs have a set occurrence probability of 0.5. With these occurrence probabilities, 10,000 random input samples were generated and leakage current 901 was plotted for a determination using a circuit simulator and the SP method according to embodiments of the present invention. The average leakage 901 was calculated using the circuit simulation. The results in FIG. 9 show good agreement with the SP leakage current 903 and simulation results 902. The relative error is well bounded and is less than 5% at each data point. The special handling of the input probabilities may be more useful when the occurrence probabilities of a circuit (or a macro) are obtained from a higher-level analysis and simulation tool, possibly from a behavioral or architectural level analysis.

In previous sections, it was shown that leakage is heavily dependent on key process and environmental parameters. Hence, a thorough analysis framework should take into account dependencies on such key parameters. In doing so, designers are able to assess leakage performance more reliably, at nominal, favorable, and adverse operating conditions.

One approach to assess the dependency of leakage on a particular process or environmental parameter (p), is to estimate the average leakage at different p's. This requires the design components (gates) to be pre-characterized for all p's and leakage estimates to be calculated using different tables. A more practical alternative for modeling the parametric dependency is estimating the sensitivity of average leakage with respect to a p.

Embodiments of the present invention use sensitivities of the leakage for each cell at each input, i.e., the set of d(Li(xi))/dp values, that have been predetermined and are available in the pre-characterized library. This may be done in a straightforward manner during a library pre-characterization step. Moreover, it is assumed that the variation in a particular p does not change the logical state of the circuit. This assumption is fairly valid due to the assumed robustness of logic functionality with respect to process/environmental conditions. This would imply that state occurrence probabilities are independent of p. This is a very crucial result, since the estimate for the average leakage sensitivity to p may be written in the same manner as the nominal estimate as Equation (5):

$$\frac{d\mu_{SP,Ltot}}{dp} = \sum_i \sum_{x_i} \hat{\prod}_i (x_i) \frac{dL_i(x_i)}{dp} \quad (7)$$

Similarly, higher order sensitivities would be in a similar form:

$$\frac{d^n \mu_{SP,Ltot}}{dp^n} = \sum_i \sum_{x_i} \hat{\prod}_i (x_i) \frac{d^n L_i(x_i)}{dp^n} \quad (8)$$

The determining sensitivities of circuit leakage to process and environmental parameters are essential to making realistic design decisions and optimization. In a power-aware methodology, the sensitivity to a controllable design parameter, e.g., threshold voltage or oxide thickness, is key to minimizing total power dissipation.

Figure 10:
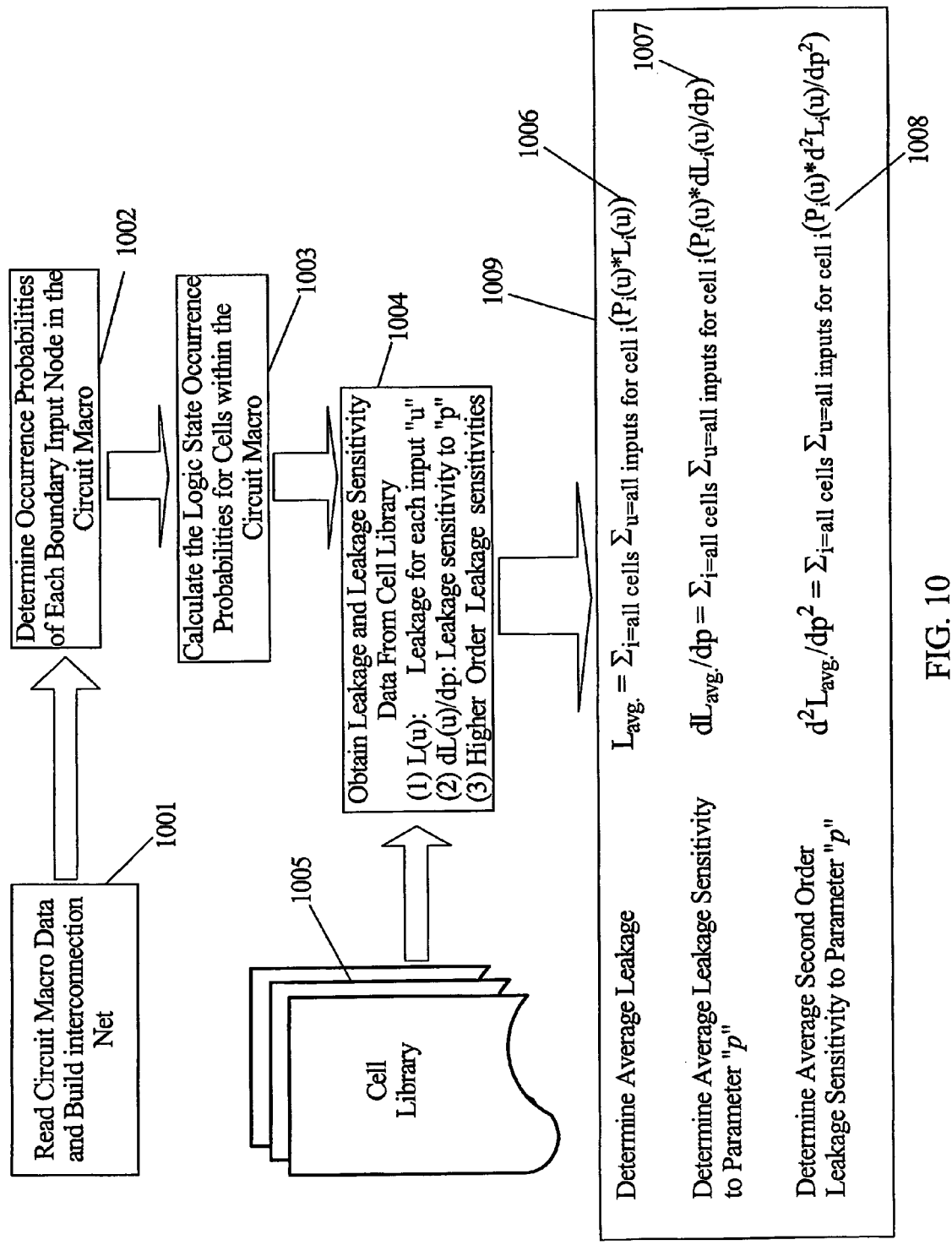
FIG. 10 is a flow diagram of steps in determining leakage sensitivities of a process parameter "p" according to embodiments of the present invention.

FIG. 10 is a block diagram illustrating method steps according to embodiments of the present invention. In block 1001, the circuit design data that defines the cells in circuit macros is read and the net list is used to build the interconnection nets. In block 1002, the occurrence probabilities for each boundary input to circuit macros are determined. Circuit macros may have a limited number of inputs but many logic depth levels with many input nodes. In block 1003, the logic state occurrence probabilities for the cells in the circuit macros are calculated. This is done using the method illustrated in FIG. 6. In block 1004, the leakage and leakage sensitivity data for the process and environmental parameters are retrieved from the cell library. This data was predetermined using circuit simulation and analysis programs. With this data and the results from block 1003, the average leakage is determined using equation 1006 in block 1009. Likewise, the average leakage sensitivity 1007 for exemplary parameter "p" is determined using equation 1007. Higher order leakage sensitivities may be calculated using equation 1008 if necessary.

Figure 11:
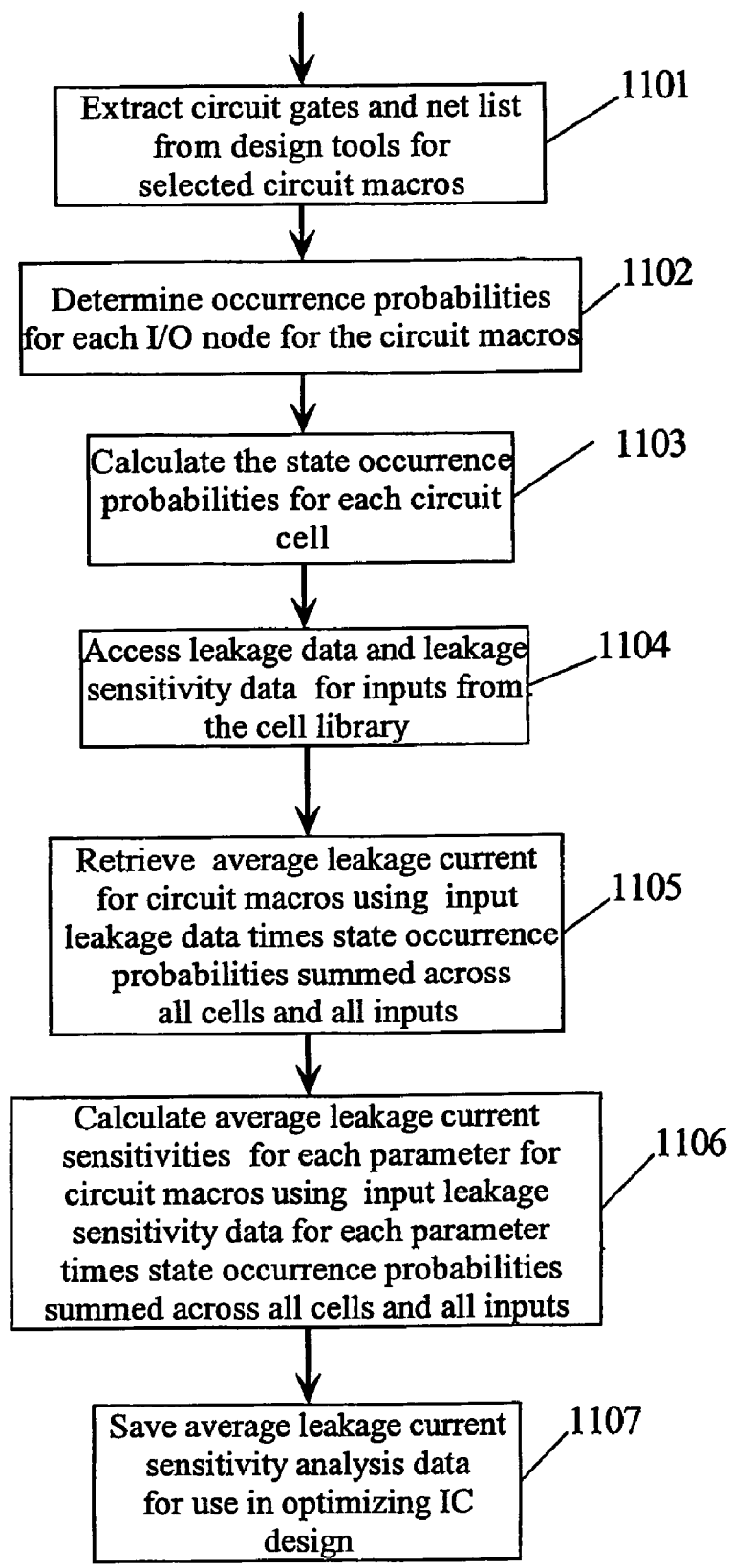
FIG. 11 is a flow chart of method steps for designing an IC according to embodiments of the present invention.

FIG. 11 is a flow diagram of method steps used in embodiments of the present invention. In step 1101, the circuit gates and net list making up selected circuit macros are extracted from design tool data. In step 1102, the occurrence probabilities for the inputs to the circuit macro are determined. This may be obtained from circuit simulation software. In step 1103, the logic state occurrence probabilities for each gate are determined using the method illustrated in FIG. 6. In step 1104, the leakage and leakage sensitivity for the cells are retrieved from the cell library. This data was predetermined using circuit simulation and analysis. In step 1105, the average leakage current for the selected circuit macros is calculated using embodiments of the present invention wherein the leakage data is multiplied times the state occurrence probabilities and summed across all cells and all inputs. In step 1106, the average leakage sensitivities for each parameter for the selected circuit macros are calculated using embodiments of the present invention wherein the leakage sensitivity data is multiplied times the state occurrence probabilities and summed across all cells and all inputs. In step 1107 the leakage current and leakage sensitivity data for the process parameters is stored for use in optimizing IC design.

Figure 12:
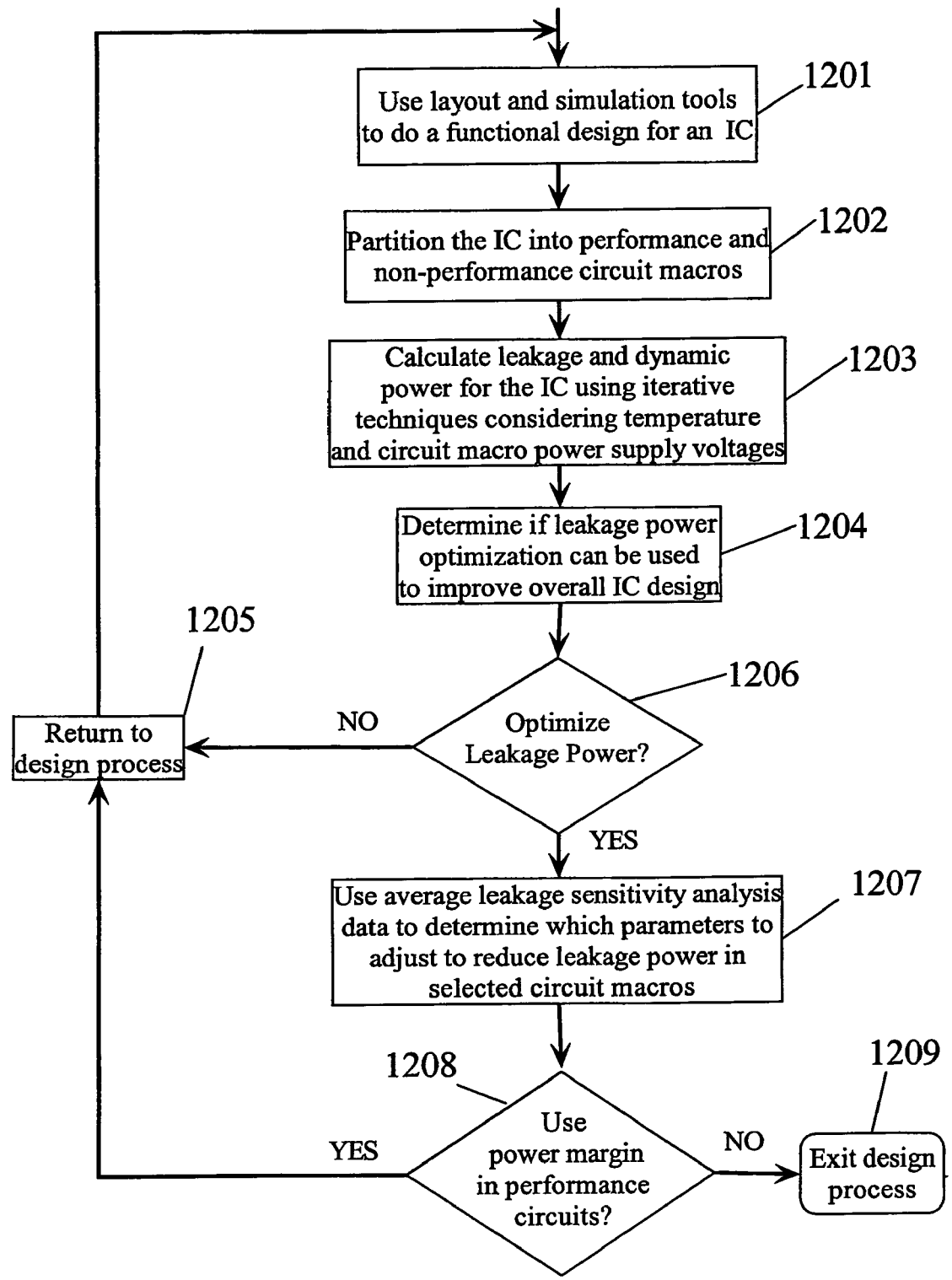
FIG. 12 is a flow chart of method steps in determining average leakage sensitivities according to embodiments of the present invention.

FIG. 12 is a flow diagram of method steps used in embodiments of the present invention for optimizing the design of an IC. In step 1201, layout and simulation tools are used to do functional design for an IC. In step 1202, the IC is partitioned into timing-critical and timing-noncritical circuit macros. In step 1203, the leakage and dynamic power for the IC are calculated using iterative techniques considering temperature and circuit macro power supply voltages. In step 1204, a determination is made whether the results indicate that overall IC performance or power may be improved by optimization. If a decision to proceed with optimization is made, then in step 1207 the average leakage sensitivity data store from step 1107 of FIG. 11 is used to determine which parameters would yield the best results in reducing leakage current. In step 1208, a determination is made whether to use any acquired power margin to increase IC performance by improving the timing-critical circuits using acquired power margins. If the result of the test in step 1208 is NO, then the design process is exited and the acquired power margin is used to improve IC efficiency. If the result of the test in step 1208 is YES, then a return is taken to the design process where the timing-critical circuits may be redesigned using the acquired power margin.

A representative hardware environment for practicing the present invention is depicted in FIG. 13, which illustrates a typical hardware configuration of a workstation in accordance with the subject invention having central processing unit (CPU) 1310 and a number of other units interconnected via system bus 1312. The workstation shown in FIG. 13 includes random access memory (RAM) 1314, read only memory (ROM) 1316, and input/output (I/O) adapter 1318 for connecting peripheral devices such as disk units 1320 and tape drives 1340 to bus 1312, user interface adapter 1322 for connecting keyboard 1324, mouse 1326, speaker 1328, microphone 1332, and/or other user interface devices such as a touch screen device (not shown) to bus 1312, communication adapter 1334 for connecting the workstation to a data processing network, and display adapter 1336 for connecting bus 1312 to display device 1338. Cell library data may be stored in RAM 1314 or in store units 1320 and 1340. Circuit analysis and simulation programs may be run on CPU 1334 to predetermine the leakage current dependencies of cells relative to process and environmental parameters. Likewise, CPU 1334 may run a program to calculate the average leakage currents and sensitivities using state occurrence probabilities for the cells in circuit macros. In addition, CPU 1334 may run software design programs that are used to design the circuit macros and partition them into timing-critical and timing-noncritical circuits. The software design program may access leakage sensitivity data obtained using embodiments of the present invention to direct a designer to parameters that may be modified to best optimize leakage power during the design process. Data from these programs may be stored in RAM 1314.

Although the present invention and its advantages have been described in detail, it should be understood that various changes, substitutions and alterations can be made herein without departing from the spirit and scope of the invention as defined by the appended claims.

What is claimed is:

1. A method for designing an integrated circuit (IC) having IC parameters including process, circuit, and environmental design parameters comprising the steps of:

using design tools to layout and configure circuit macros making up said IC;

determining a leakage power for each of said circuit macros;

determining average leakage power sensitivities for said circuit macros to variations in said IC parameters;

selecting first parameters from said IC parameters in response to analyzing said average leakage power sensitivities; and reducing said leakage power for one or more selected circuit macros of said circuit macros of said IC by modifying one or more of said first parameters.

2. The method of claim 1, wherein said circuit macros are classified as timing-non-critical circuit macros and timing-critical circuit macros, wherein said timing-non-critical circuit macros may have said IC parameters modified without significantly affecting an overall IC performance.

3. The method of claim 1, wherein said one or more selected circuit macros correspond to timing-non-critical circuit macros.

4. The method of claim 2 further comprising the step of determining a power dissipation margin as a difference between a first design power dissipation for said IC and a second power dissipation determined for said IC after said step of reducing said leakage power.

5. The method of claim 4 further comprising the step of redesigning one of said circuit macros corresponding to said timing-critical circuit macros using said power dissipation margin to improve a performance of said redesigned circuit macro while keeping said overall IC power substantially equal to or below said first design power dissipation for said IC.

6. The method of claim 1, wherein said average leakage power sensitivity is determined by a method comprising the steps of:

determining occurrence probabilities for each input node of said circuit macros;

calculating state occurrence probabilities for each cell within said circuit macros;

retrieving predetermined leakage data and leakage power sensitivity data as a function of said IC parameters for cell inputs for said circuit macros from the cell library;

calculating an average leakage current for said circuit macros in response to said leakage data from said retrieving step, said occurrence probabilities for each of said input nodes of said circuit macro, and said state occurrence probabilities of each cell within said circuit macros;

calculating an average leakage power sensitivity for each circuit macro corresponding to each of said IC parameters in response to the leakage power sensitivity data from said retrieving step, said occurrence probabilities for each of said input nodes of said circuit macro, and said state occurrence probabilities of each cell within said circuit macros; and saving average leakage power sensitivity data for each of said IC parameters for each circuit macro for use in optimizing said IC design.

7. The method of claim 6, wherein said leakage data and said leakage power sensitivity data for said IC parameters for said cell inputs are predetermined by using circuit analysis and circuit simulation tools.

8. The method of claim 6, wherein said step of calculating said average leakage current uses a method comprising the steps of:

multiplying leakage currents for each logic state of each node of each cell of said circuit macro times corresponding logic state occurrence probabilities for each of said nodes generating a node leakage current for each node of each cell;

summing said node leakage current across each node of said cell generating cell leakage currents; and summing said cell leakage currents across each cell generating said average macro leakage current.

9. The method of claim 6, wherein said step of calculating said average leakage power sensitivity for a parameter P of said IC parameters uses a method comprising the steps of:

multiplying a leakage power sensitivity for said parameter P for each logic state of each node of each cell of said circuit macro times corresponding logic state occurrence probabilities for each of said nodes generating a node leakage power sensitivity for each node of each cell;

summing said node leakage power sensitivities across each node of said cell generating a cell leakage power sensitivity for said parameter P; and summing said cell leakage sensitivities across each cell of said macro generating said average macro leakage power sensitivity.

10. The method of claim 6 further comprising the step of outputting said saved leakage power sensitivity data during IC design in response to a designer request to evaluate affects of modifying said IC parameters to reduce a macro leakage current.

11. A computer program product for determining an average macro leakage power sensitivity for an IC parameter, said computer program product embodied in a machine readable medium, including programming for a processor, said computer program comprising a program of instructions which when executed performing the program steps of:

using design tools to layout and configure circuit macros making up said IC;

determining a leakage power for each of said circuit macros;

determining average leakage power sensitivities for said circuit macros to variations in said IC parameters;

selecting first parameters from said IC parameters in response to analyzing said average leakage power sensitivities; and reducing said leakage power for one or more selected circuit macros of said circuit macros of said IC by modifying one or more of said first parameters.

12. The computer program product of claim 11, wherein said circuit macros are classified as timing-non-critical circuit macros and timing-critical circuit macros, wherein said timing-non-critical circuit macros may have said IC parameters modified without significantly affecting an overall IC performance.

13. The computer program product of claim 11, wherein said one or more selected circuit macros correspond to timing-non-critical circuit macros.

14. The computer program product of claim 12 further comprising the step of determining a power dissipation margin as a difference between a desired design power dissipation for said IC and a design power dissipation determined for said IC after said step of reducing said leakage power.

15. The computer program product of claim 14 further comprising the step of redesigning one of said circuit macros corresponding to said timing-critical circuit macros using said power dissipation margin to improve a performance of said redesigned circuit macro while keeping said overall IC power substantially equal to or below said desired design power dissipation for said IC.

16. The computer program product of claim 11, said average leakage power sensitivity is determined by a method comprising the steps of:

determining occurrence probabilities for each input node of said circuit macros;

calculating state occurrence probabilities for each cell within said circuit macros;

retrieving predetermined leakage data and leakage power sensitivity data as a function of said IC parameters for cell inputs for said circuit macros from the cell library;

calculating an average leakage current for said circuit macros in response to said leakage data from said retrieving step, said occurrence probabilities for each of said input nodes of said circuit macro, and said state occurrence probabilities of each cell within said circuit macros;

calculating an average leakage power sensitivity for each circuit macro corresponding to each of said IC parameters in response to the leakage power sensitivity data from said retrieving step, said occurrence probabilities for each of said input nodes of said circuit macro, and said state occurrence probabilities of each cell within said circuit macros; and saving average leakage power sensitivity data for each of said IC parameters for each circuit macro for use in optimizing said IC design.

17. The computer program product of claim 16, wherein said leakage data and said leakage power sensitivity data for said IC parameters for said cell inputs are predetermined by using circuit analysis and circuit simulation tools.

18. The computer program product of claim 16, wherein said step of calculating said average leakage current uses a method comprising the steps of:

multiplying leakage currents for each logic state of each node of each cell of said circuit macro times corresponding logic state occurrence probabilities for each of said nodes generating a node leakage current for each node of each cell;

summing said node leakage current across each node of said cell generating cell leakage currents; and summing said cell leakage currents across each cell generating said average macro leakage current.

19. The computer program product of claim 16, wherein said step of calculating said average leakage power sensitivity for a parameter P of said IC parameters uses a method comprising the steps of:

multiplying a leakage power sensitivity for said parameter P for each logic state of each node of each cell of said circuit macro times corresponding logic state occurrence probabilities for each of said nodes generating a node leakage power sensitivity for each node of each cell;

summing said node leakage power sensitivities across each node of said cell generating a cell leakage power sensitivity for said parameter P; and summing said cell leakage sensitivities across each cell of said macro generating said average macro leakage power sensitivity.

20. The computer program product of claim 16 further comprising the step of outputting said saved leakage power sensitivity data during IC design in response to a designer request to evaluate affects of modifying said IC parameters to reduce a macro leakage current.

* * * * *